Dec. 11, 1923.  
F. JEFFREY  
SYSTEM OF CONTROL  
Filed Sept. 20, 1919  
1,476,978
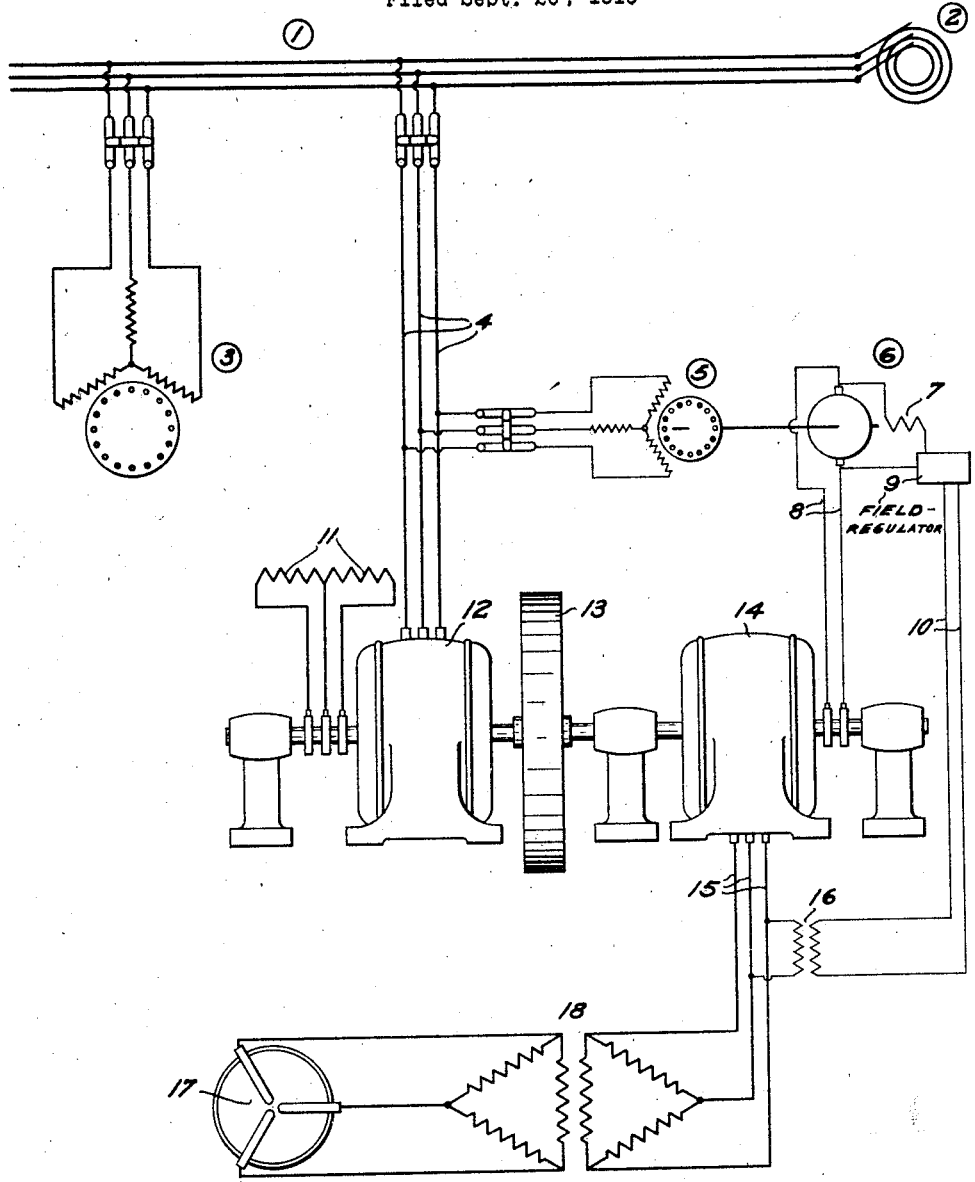

Patented Dec. 11, 1923.

1,476,978

UNITED STATES PATENT OFFICE.

FRASER JEFFREY, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SYSTEM OF CONTROL.

Application filed September 20, 1919. Serial No. 325,592.

*To all whom it may concern:*

Be it known that FRASER JEFFREY, a citizen of the Dominion of Canada, residing at Milwaukee, in the county of Milwaukee and State of Wisconsin, has invented a certain new and useful Improvement in Systems of Control, of which the following is a specification.

This invention relates to a system of control and more particularly to a system which may be utilized for reducing line peaks caused by fluctuating loads such as occur, for example, in electric furnace work.

One of the objects of the invention is the provision of means whereby line peaks may be reduced in a simple and efficient manner. Another object is the provision of means whereby such peaks may be reduced rapidly, while maintaining the voltage of the energy supplied to the furnace. Other objects will appear hereinafter as the description of the invention proceeds.

The novel features of the invention will appear from the specification and the accompanying drawing forming a part thereof and disclosing one embodiment of said invention, and all these novel features are intended to be pointed out in the claims.

The single figure of the drawing is a diagrammatic showing of the invention as it may be applied in a system supplying energy to an electric furnace.

In the drawing a main generator 2 supplies mains 1, from which mains any desirable number and kind of electrical translating devices, as the induction motor 3, or other load, and the electric furnace 17, may be supplied.

The electric furnace 17 is supplied from the feeders 4 through a motor generator set comprising the alternating current motor 12, preferably of the induction type, and the alternating current generator 14. In order to provide for a storing of energy a fly-wheel 13 is provided coupled in any suitable manner to the drive between the motor 12 and generator 14. The motor 12 is provided with a permanent or buffer resistance 11 connected across the leads from the slip rings of the wound rotor of the motor. The alternating current generator supplies the electric furnace 17 through leads 15 and, if necessary or desirable, a transformer 18.

The alternating current generator 14 is provided with an exciter 6 feeding the field of the generator through leads 8. The exciter is driven by an induction motor 5 connected to the feeders 4. The exciter is provided with a suitable field winding 7 the circuit of which is controlled by a regulator 9 in turn controlled by electrical conditions obtaining in the leads 15 of the generator, as for example, the voltage across these leads, through the conductors 10 and the voltage transformer 16.

The operation of the system is as follows: A heavy increase of load caused by a greater demand for current by the electric furnace will cause a very prompt reduction in speed of the induction motor 12 due to the buffer resistance 11. The voltage at the terminals of the alternating current generator may perhaps for the moment have been somewhat reduced and the field regulator of the exciter tends to check this reduction, but as the energy demand upon the alternating current generator has been greatly increased, the regulator could not alone adjust the existing conditions. In combination however with the prompt reduction in speed of the induction motor, the fly-wheel 13 will give up a material portion of its energy to driving the alternating current generator, whereby the added peak load, at the desired voltage, is provided for. This peak load is however not put upon the mains 1, but, as is clear, is taken care of by energy from the fly-wheel in the manner set forth.

It should be understood that it is not desired to be limited to the exact details of construction herein shown and described, for various modifications within the scope of the appended claims may occur to persons skilled in the art.

It is claimed and desired to secure by Letters Patent:

1. In a system for supplying current to a fluctuating load, a fly-wheel unit comprising an alternating current generator and an induction motor, said motor being connectible to a source of alternating current, a permanent resistance connected in circuit with the rotor of said motor, and means for regulating the voltage of said generator responsive to a factor of the power supplied by said alternating current generator.

2. In a system for supplying current to a fluctuating load, a fly-wheel unit comprising an alternating current generator and an induction motor, said motor being connectible to a source of alternating current, a permanent resistance connected in circuit with the rotor of said motor, and means for regulating the voltage of said generator responsive to the voltage across terminals of said alternating current generator.

3. In a system for supplying current to a fluctuating load, an alternating current generator, an induction motor connectible to a source of alternating current for driving said generator, a fly-wheel mechanically connected to said motor and generator, a permanent resistance in circuit with the rotor of said induction motor, an exciter for said alternating current generator and a voltage regulator for said generator comprising a field regulator for said exciter responsive to the voltage across terminals of said alternating current generator.

4. In a system for supplying current to a fluctuating load, a fly wheel unit comprising a generator and an induction motor, means for causing an instantaneous increase of slip energy in the secondary circuit of said motor whereby the torque of the motor is instantly reduced upon an increase of load on said motor, and means for regulating the voltage of said generator responsive to a factor of the power supplied by said generator.

5. In a system for supplying current to a fluctuating load, a fly wheel unit comprising a generator and an induction motor, means for causing an instantaneous increase or decrease of slip energy in the secondary circuit of said motor whereby the torque of said motor is instantly respectively decreased or increased upon an increase or decrease of load respectively on said motor, and means for regulating the voltage of said generator responsive to a factor of the power supplied by said generator.

In testimony whereof, the signature of the inventor is affixed hereto.

FRASER JEFFREY.